United States Patent [19]

Cook

[11] 4,023,207

[45] May 10, 1977

[54] VIDEO TAPE CASSETTE CHANGING APPARATUS

[76] Inventor: Thorsten P. Cook, R.R. 1, Box 21A, Pound Ridge, N.Y. 10576

[22] Filed: June 25, 1975

[21] Appl. No.: 590,147

[52] U.S. Cl. ............................................. 360/92
[51] Int. Cl.$^2$ ...................................... G11B 15/68
[58] Field of Search ...................... 360/92, 69, 71

[56] References Cited

UNITED STATES PATENTS

| | | | |
|---|---|---|---|
| 3,582,082 | 6/1971 | Takagi | 360/92 |
| 3,603,597 | 9/1971 | Haake | 360/92 |
| 3,672,686 | 6/1972 | Ban | 360/92 |
| 3,756,608 | 9/1973 | O'Neill et al. | 360/92 |
| 3,758,122 | 9/1973 | Kawaharasaki | 360/92 |
| 3,767,207 | 10/1973 | Okabe | 360/92 |
| 3,800,319 | 3/1974 | Fujimoto et al. | 360/92 |
| 3,886,591 | 5/1975 | Bettini | 360/92 |

Primary Examiner—Robert S. Tupper

[57] ABSTRACT

In accordance with an illustrative embodiment of the present invention, a video tape cassette changer is disclosed that is intended for use with a video cassette tape player having a cassette receiving portion that includes a cassette raising and lowering mechanism for lowering a received cassette into a play position and raising a rejected cassette out of the play position. The changer includes a chute, which is positioned near the player receiving portion and may receive a stack of video tape cassettes for playing, and a support arrangement for supporting the stack of cassettes and for releasing the lowest cassette in the stack. A cassette insertion/extraction mechanism is positioned near the player receiving portion and the supporting arrangement for accepting a released cassette for insertion in the receiving portion and for accepting a raised cassette for extraction from the receiving portion and ejection from the changer. The support arrangement and the insertion/extraction mechanism are synchronized with the player receiving portion to control the changer so that a cassette for playing is inserted in the receiving portion after ejection of a rejected cassette from the changer.

9 Claims, 7 Drawing Figures

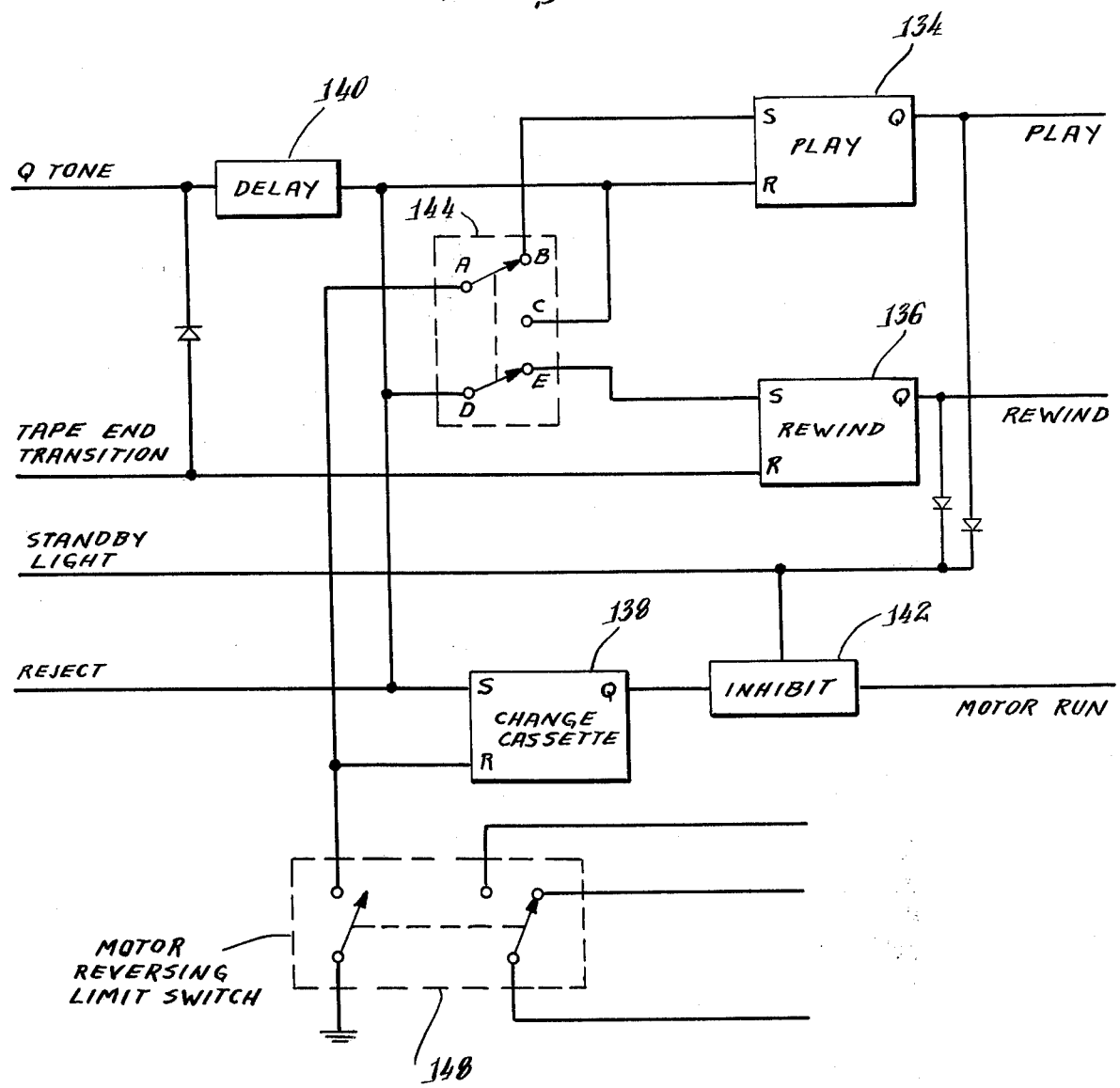

VIDEO TAPE CASSETTE CHANGING APPARATUS

BACKGROUND OFF THE INVENTION

The present invention relates to magnetic tape cassette changers and the like and, more particularly, to apparatus for changing a video tape cassette with a video cassette tape player having a cassette receiving portion that includes a cassette raising and lowering mechanism for lowerinng a received cassette into a play position and raising a rejected cassette out of the play position.

SUMMARY OF THE INVENTION

There is provided, therefore, in accordance with the present invention, a changer that in includes a chute, which is positioned a near the player receiving portion and may receive a stack of video tape cassette for playing, and a support arrangement for supporting the stack of cassettes and for releasing the lowest cassette in the stack. A cassette insertion/extraction mechanism is positioned near the player receiving portion and the supporting arrangement for accepting a released cassette for insertion in the receiving portion and for accepting a raised cassette for extraction from the receiving portion and ejection from the changer. The support arrangement and the insertion/ extraction mechanism are synchronized with the player receiving portion to control the changer so that a cassette for playing is inserted in the receiving portion after ejection of a rejected cassette from the changer.

The support arrangement has at least two positions. In the first position, a stack of cassettes, the number of which depends on the capacity of the chute, is supported over the player receiving portion by a lower support surface. In the second position, the lowest cassette in the stack is gripped and released to fall into the receiving portion of the player while the remaining cassettes in the stack are supported on an upper support surface. The support arrangement also includes a separating edge for parting the lowest cassette in the stack from the remaining cassettes in the stack during the movement of the support mechanism from the first position of the second position.

When the supporting mechanism moves from the second position back to the first position, the remaining cassettes in the stack will fall to be supported by the lower support surface, and, therefore, the changer also includes a resiliant suspension mechanism for suspending the supporting means and the stack of cassettes. The suspension mechanism is arranged for resilient, vertical movement of the supporting means and the cassettes to minimize the shock to the changer apparatus caused by the drop of the remaining cassettes to the lower supporting surface.

The insertion/extraction mechanism includes a cassette insertion portion and a cassette extraction portion. The insertion portion includes a plate that has a front insertion surface that is used to urge a cassette into the player receiving mechanism of the video tape player and the extraction portion has a rear extraction surface that is used for pushing a rejected cassette out of the video tape receiving portion. The insertion plate is resiliantly mounted on the insertion portion and is positioned so that a cassette that has been released by the supporting mechanism strikes the insertion surface to assist in the insertion of the cassette into the player receiving portion.

Synchronization of the insertion/extraction mechanism and the support arrangement with the player receiving portion is suitably accomplished through the use of a gear train driven by a reversible motor for driving a geneva mechanism that actuates the insertion-/extraction mechanism.

Advantageously, the changer includes a rejection capability so that a cassette may be rejected at any time during the play cycle of the video tape player and a multi-mode operational selection capability so that a number of different operating modes, such as, for example, rewind-only, play-only and automatic play-rewind, may be selected as desired by an operator.

BRIEF DESCRIPTION OF THE DRAWING

Further objects and advantages of the present invention will be apparent and a better understanding of the invention will be gained from a consideration of the following description of the preferred embodiments, taken in conjunction with the appended figures of the drawing, in which:

FIG. 6 is a simplified logic diagram of the control system of a changer in accordance with the present invention.

DESCRIPTION OF THE PREFERRED EMBODIMENTS

In the representative embodiments of the invention described hereinafter and shown in FIGS. 1 and 2, a video tape cassette changer 10 is disclosed that is intended for use with a video cassette tape player 12 having a cassette receiving portion 14 that includes conventional cassette raising and lowering mechanism (not shown) for lowering a received cassette into a play position and raising a rejected cassette out of the play position.

Figure 1:
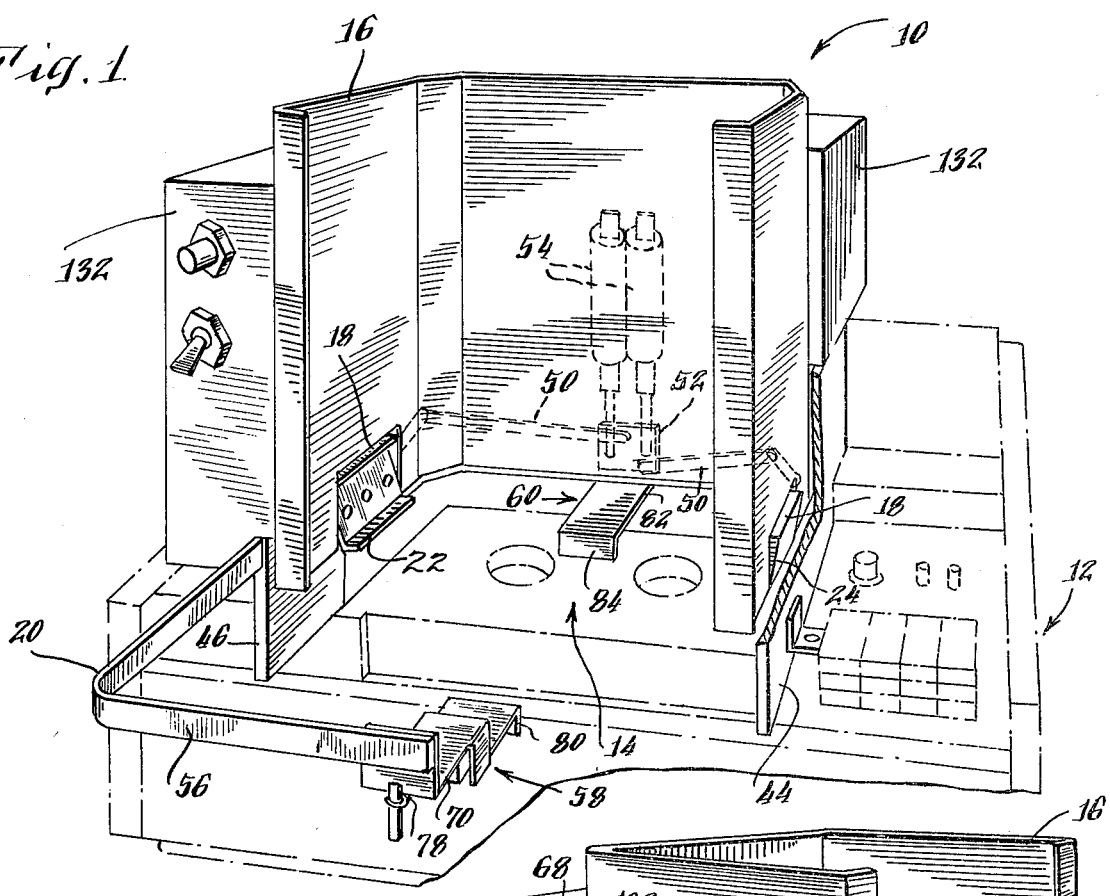
FIGS. 1 and 2 are isometric views, in partial cross-section, of a video tape cassette changer in accordance with the present invention.

As shown in FIG. 1, the changer includes a chute 16, which is positioned over the receiving portion of the tape player. The chute is shaped so that it may receive a stack of video tape cassettes, which are suspended by a support arrangement 18 that supports the stack of cassettes and, as will be explained hereinafter, that releases the lowest cassette in the stack for insertion in the receiving portion of the tape player 12. The changer also includes a cassette insertion/extraction mechanism 20 that is positioned near the receiving portion 14 of the player and the supporting arrangement 18 for accepting a cassette that has been released for insertion into the receiving portion and for accepting a raised cassette for extraction from the receiving portion and ejection from the changer.

The support arrangement 18 and the insertion/extraction mechanism 20 are synchronized with the player receiving portion as will be described hereinafter to control the changer so that a cassette for playing is inserted in the receiving portion 14 after ejection of a rejected cassette from the changer.

Figure 4:
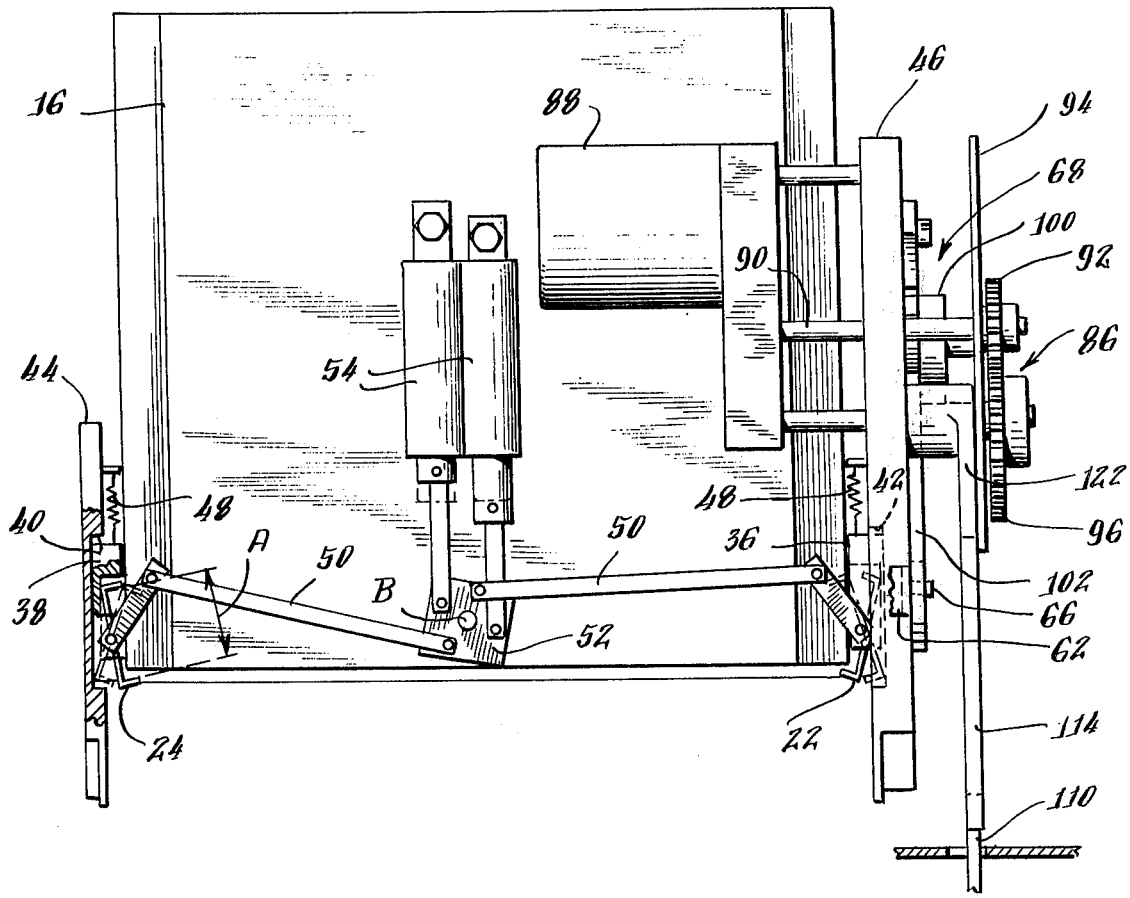
FIG. 4 is a rear view, in partial cross-section, of the changer of FIGS. 1 and 2.

The player 12 may be any conventional video tape cassette player, such as a Sony Model VP-1200, and the video tape cassette changer disclosed herein may be modified as required for use with the selected player. As shown in FIGS. 1, 2 and 4, the support arrangement 18 includes a pair of jaws 22, 24 that are of a suitable dimension A to be able to grip individual cassettes stacked in the chute 16. Advantageously, each of the jaws 22, 24 has an upper support surface 26, a lower support surface 28 and a separating edge 30 that will be useful in the operating cycle of the changer to be explained hereinafter.

Figure 5:
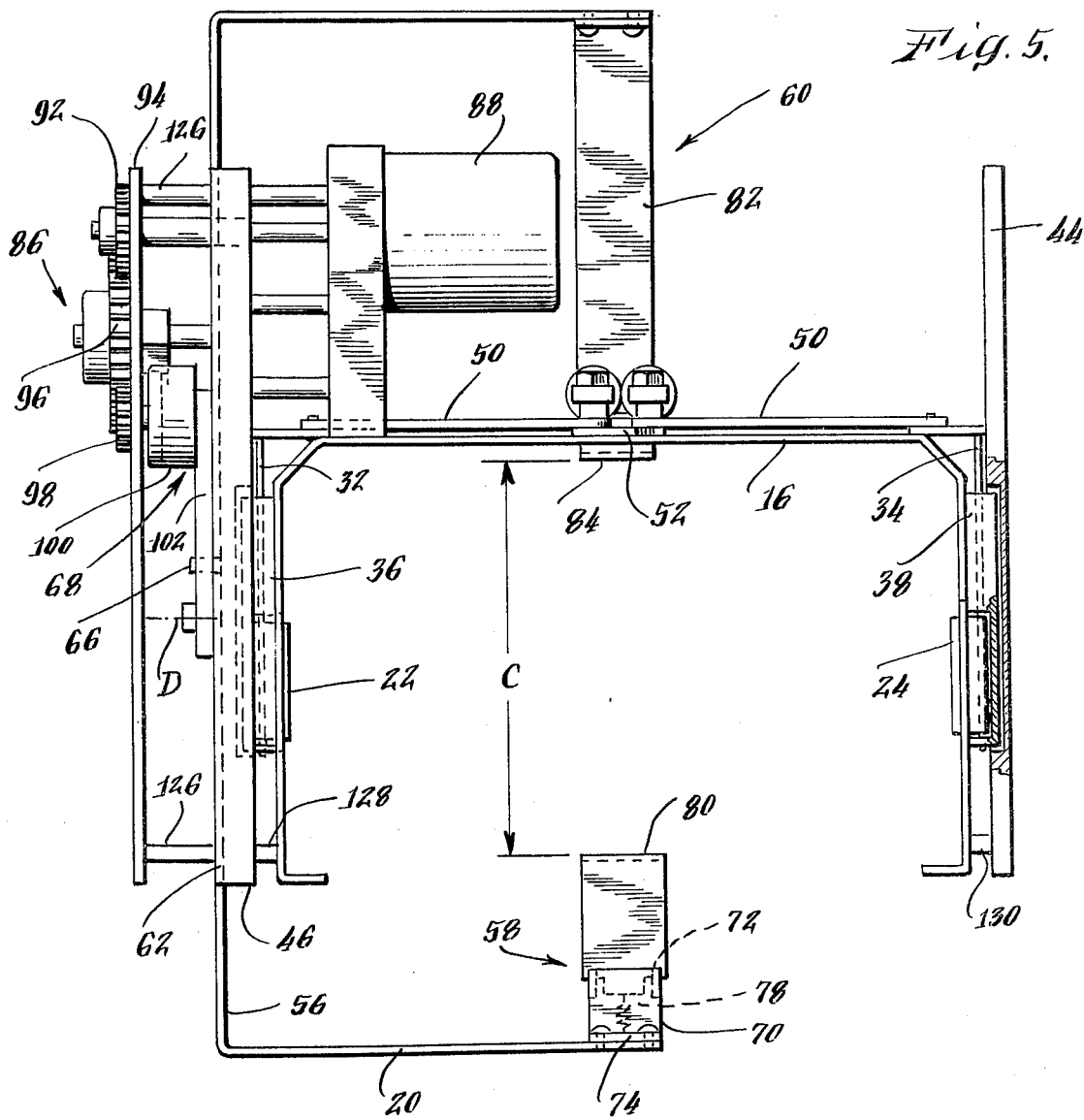
FIG. 5 is a top view, in partial cross-section, of the changer of FIGS. 1 and 2.

Each of the jaws 22, 24 is suspended as shown in FIGS. 4 and 5. Jaws 22, 24 are actuated, respectively, by control rods 32, 34, shown in FIG. 5 and are suspended in mounting blocks 36, 38, which are retained within recesses 40, 42 in the mounting plates 44, 46 of the changer. To obtain resiliant suspension of each jaw and mounting block assembly, a plurality of springs 48 may be usd to permit resiliant vertical movement of the assembly to minimize the shock to the assembly when the video cassettes fall as the stack is lowered during the play/reject cycle.

During the operation of the changer 10, jaws 22, 24 move, as shown in FIG. 4, between a first position that is shown in dashed lines and in which the stack of cassettes in the chute 16 are supported on the upper support surface 26 and a second position that is shown in solid lines and in which the stack is allowed to fall onto the lower support surface 28. One method suitable for moving the jaws between the first and second position is the linkage and solenoid arrangement shown in FIG. 4. The linkage assemblies 50 are attached at one end to the end of control rods 32, 34 and at the other end to a plate 52. The plate is mounted on the rear of chute 16 for rotational movement about point B to transfer movement from the solenoids 54, which may also be mounted on chute 16 and are energized at the appropriate times, to cause jaws 22, 24 to alternate between the first and second positions. During the movement from the second position to the first position, when the lowest cassette in the stack is released to fall into the cassette receiving portion 14 of the player, the separating edges 30 shown in FIG. 1 assist in (1) parting the lowest cassette in the stack so that it may be dropped to the receiving portion and (2) shifting the weight of the remaining cassettes in the stack onto the upper support surface 26.

The insertion/extraction mechanism 20, which may best be described with reference to FIGS. 1, 2, 3 and 5, includes a generally C-shaped bar 56 and a front cassette insertion portion 58 an a rear cassette extraction portion 60, each of which is mounted on the bar 56. The bar 56 is slideably retained in a slot 62, which is formed in changer mounting plate 46, by one or more retaining straps 64.

Actuation of the front and rear movement of the C-shaped bar 56 is by means of a pin 66 fastened to the bar that engages a geneva mechanism 68 the operatiȯn of which will be further explained hereinafter.

The front cassette insertion portion 58 includes a mounting bracket 70 that has forward retaining notches 72 and a rear fastening piece 74. Received within the notches 72 is an insertion plate 76, which is retained in place by means of a spring 78 that is fastened to the rear fastening piece 74 of the bracket 70 and the back of the insertion plate 76. The front portion of the insertion plate 76 is bent to present, in transverse cross-section, an approximately right angle surface that defines a front insertion surface 80, which is useful as will be explained hereinafter.

The rear extraction portion 60, also best described with reference to FIGS. 3 and 5, includes an extraction plate 82 that is fastened to the rear portion of the C-shaped bar 56 and has, in transverse cross-section, an angulated shape that defines a rear extraction surface 84.

The distance between the front and rear extraction surfaces C is established so that is exceeds the corresponding dimension of a video tape cassette by some small amount, say ¼ inch, so that when the cassette is released by the jaws 22, 24 it will be able to enter the player receiving portion 14.

Synchronization of the insertion/extraction mechanism 20 with the operation of the support arrangement 18 is critical for insuring that the cassette is properly received within the receiving portion of the player, and the proper position of the C-shaped bar and the achievement thereof is also important and will be described hereinafter in the description of the operation of the changer.

One means that is suitable for synchronizing the operation of the various components of the changer 10 is a gear train 86, which may be driven by a reversible motor and gear transfer case 88 through an output shaft 90 to a drive gear 92. As shown in FIGS. 2, 3, 4, and 5, the gear train 86 is supported by shafts that are mounted in the mounting plate 46 and a synchronization support plate 94. Driven gears 96 and 98 are used to synchronize the support arrangement 18 and the insertion/extraction mechanism 20 with the operation of the player to permit changing of a video tape cassette at the proper time.

Connected to the shaft on which gear 98 is mounted and positioned on the side of plate 94 opposite from gear 98 is a geneva drive mechanism 100. Geneva mechanism 68, which includes the drive mechanism 100 and a plte 102, is a conventional geneva device that has merely been dimensioned and positioned to fit the needs of the changer disclosed herein. The geneva plate 102 is mounted on the changer mounting plate 46 for rotational movement about center D and has in its lower arm a slot 104 that receives the pin 66 on C-shaped bar 56 to move the bar in a front and rear movement. As is conventional with geneva drives, drive mechanism 100 includes a pin 106 that engage slot 108 in the upper portion of the geneva plate 102. As the gear 98 rotates in a clockwise or counter-clockwise direction the pin 106 will engage one of the slots and cause the plate 102 to rotate about axis D, thereby moving bar 56 a distance that is determined primarily by the radial distance of the location of the pin 106 from the axis of rotation of the gear 98. With a geneva drive mechanism 100 and a geneva plate 102 having the number of slots 108 that is shown in FIGS. 2 and 3, front or rear movement of the bar 56 is possible in stages that will include three stationary periods, when pin 106 is rotating without engaging a slot, and two periods of sliding movement, when pin 106 is engaging one of the slots 108.

Figure 2:
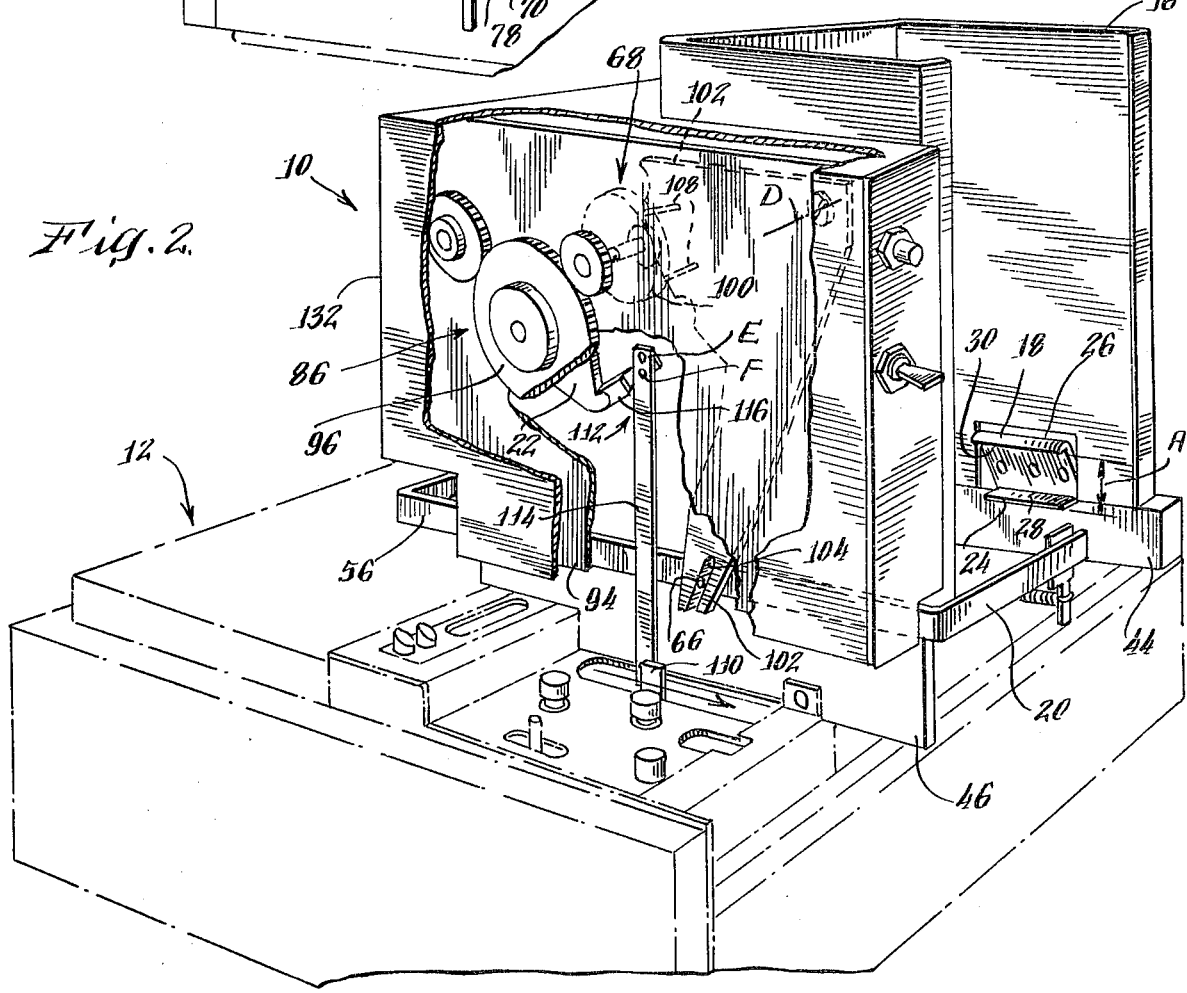

When the video tape cassette player in use is the particular Sony model identified above, rejection of a cassette from the play position is accomplished by moving a lever 110, shown in FIGS. 2 and 4, in the direction of the arrow. One method suitable for accomplishing such movement of lever 110 is the linkage arrangement 112, which includes (1) a bar 114 that is rotatably suspended from synchronization on support plate 94 at point E, for exerting pressure against lever 110, (2) a small lever 116 rotatably pinned to bar 114 at point F that has a rounded end 118 shown in FIG. 3, and (3) an angulated spring 120 that keeps lever 116 in an angular relationship with bar 114. Connected to the shaft on which gear 96 is mounted and positioned on the side of plate 94 opposite from gear 96 is the actuating arm 122, which has a rounded end portion 124 that engages the rounded end 118 of lever 116 when the gear 96 is rotating in a counter-clockwise direction, thereby causing movement of bar 114 about center E and pushing lever 110 toward the front of the Sony player for rejection of a video cassette from the play position at the appropriate time.

As shown in FIG. 5, synchronization support plate 94 may be mounted onto changer mounting plate 46 using any conventional screw and spacer arrangement 126, and a plate 46 may be fastened as shown at 128 to one side of the changer chute 16. Conveniently, the second changer mounting plate, plate 44, may be supported on the opposite side of the changer chute 16, such as shown at 130. Suitably, the changer 10 may also include any necessarycovers 132 to enclose the internal workings of the changer mechanism.

Shown in FIG. 6 is a simplified logic diagram of a control system of a changer in accordance with the present invention that is suitable for coordinating the changer operation with the operation of the selected video tape cassette player. The diagram includes a play flip-flop 134, a rewind flip-flop 136 and a changer cassette flip-flop 138. Also included is a delay line 140, inhibit gate 142, operational mode select switch 144 and motor reversing limit switch 148 for controlling the powder and direction of rotation of the reversible motor 88.

Upon receipt of a cue tone from the tape player, that is, when a tape that has been playing has reached and end of the material recorder thereon, a pulse input a delay element 140, after a suitable delay and when switch 144 is in the automatic rewind position shown, resets flip-flop 134 to stop the tape from playing and sets flip-flop 136 to start the rewind cycle.

A clear leader transition, which indicates that the tape has been rewound, resets the flip-flop 136 to stop the rewind operation and after a delay sets the change cassette flip-flop 138 to begin operation of the motor 88. Although switch 144 would also permit setting the rewind flip-flop 136, the reset signal is still present and prevents that flip-flop from being set.

A "Q" output on the change cassette flip-flop 138 starts the motor running unless inhibited by gate 142 as explained hereinafter.

An output from flip-flop 138 will be inhibited when the player is playing or rewinding and also when a standby light signal is present. Advantageously, the changer 10 will also include a reject switch or botton so that change cassette flip-flop 138 may be set at any desired time provided that an inhibit signal is not present. When switch 144 has terminals DE ooen and terminals AB closed, the changer is in a play only mode, that is, the rewind flip-flop cannot be set and each video tape cassette will be rejected at the end of its play portion so that there will be no delay between programs for rewind time on the player. Furthermore, when terminals DE are closed and terminals AC are closed, the changer may be put in a rewind only mode which would be suitable for later rewind of a series of tapes that had been played without rewind interruption.

Actuation of the motor reversing switch 148 will suitably be controlled by a limit switch arrangement, as, for example, by a switch and pin arrangement used with gear 96 or with the front and back movement of the C-shaped bar 56.

Figure 7:
FIG. 7 is a diagram of the sequence of operations of a changer in accordance with the present invention.

Shown in FIG. 7 is a timing diagram of the sequence of operation for one operating cycle of a changer in accordance with the present invention. At the beginning of the cycle a video tape has been playing in the player and is rejected by any one of the possible reject signals to set the change cassette flip-flop 138. At that point motor 88 begins operation and starts gear 96 rotating in a counter-clockwise direction to move cassette reject lever 110 on the player so that at time 2 on the diagram in FIG. 7 the cassette has been completely rejected and has been raised out of the receiving portion of the player by the player mechanism. At time 3, the pin 106 of the geneva drive mechanism 100, which had placed the C-shaped bar 56 in the full back position on the previous cycle, engages a slot 108 on the geneva plate 102 and begins movement of the bar 56 forward. As the bar begins movement in the forward direction toward the front of the changer, rear extraction surface 84 comes into contact with the back portion of the video tape cassette and begins pushing the cassette toward the front of the changer.

At time 4, pin 106 in geneva drive mechanism 110 disengages the slot 108 while the gear 96 continues rotating and leaves the C-shaped bar positioned so that it is directly underneath the stack of cassettes in chute 16. At time 5, which is during a null in the movement of the C-shaped bar 56 while the gear 96 is continuing its rotation to engage pin 106 in a second slot 108, the solenoids 54 controlling the jaws are activated to place the jaws in the second position so that the stack of cassettes in the chute is allowed to fall into the lower support surface 28. At time 6 forward movement of the C-shaped bar 56 continues until time 7, at which point the bar 56 has moved to its extreme forward position of movement and the rear extraction surface 84 has pushed the rejected cassette out of the player/changer assembly and it falls into a hopper or other receiving mechanism (not shown). Motor 88 continues to rotate until at time 8 a limit switch or appropriate timing control device reverses the motor field and causes the motor to rotate in the opposite direction. Then, at time 7', the bar 56 begins its movement from the forward position to the back position since the gear 96 is now rotating in a clockwise direction due to the reverse rotation of the motor 88.

At time 6' the bar 56 is again positioned under the stack of cassettes in the chute 16 and, during the null in movement of the bar 56 between time 6' and 4', the solenoids 54 are again activated at time 5' to place the jaws in the first position in which position the lowest cassette in the stack is released to fall into the insertion-/extraction mechanism 20, the separating edge 30 assisting in parting the lowest cassette from the stack and shifting the weight of the remaining cassettes in the stack onto the upper support surface 26.

Figure 3:
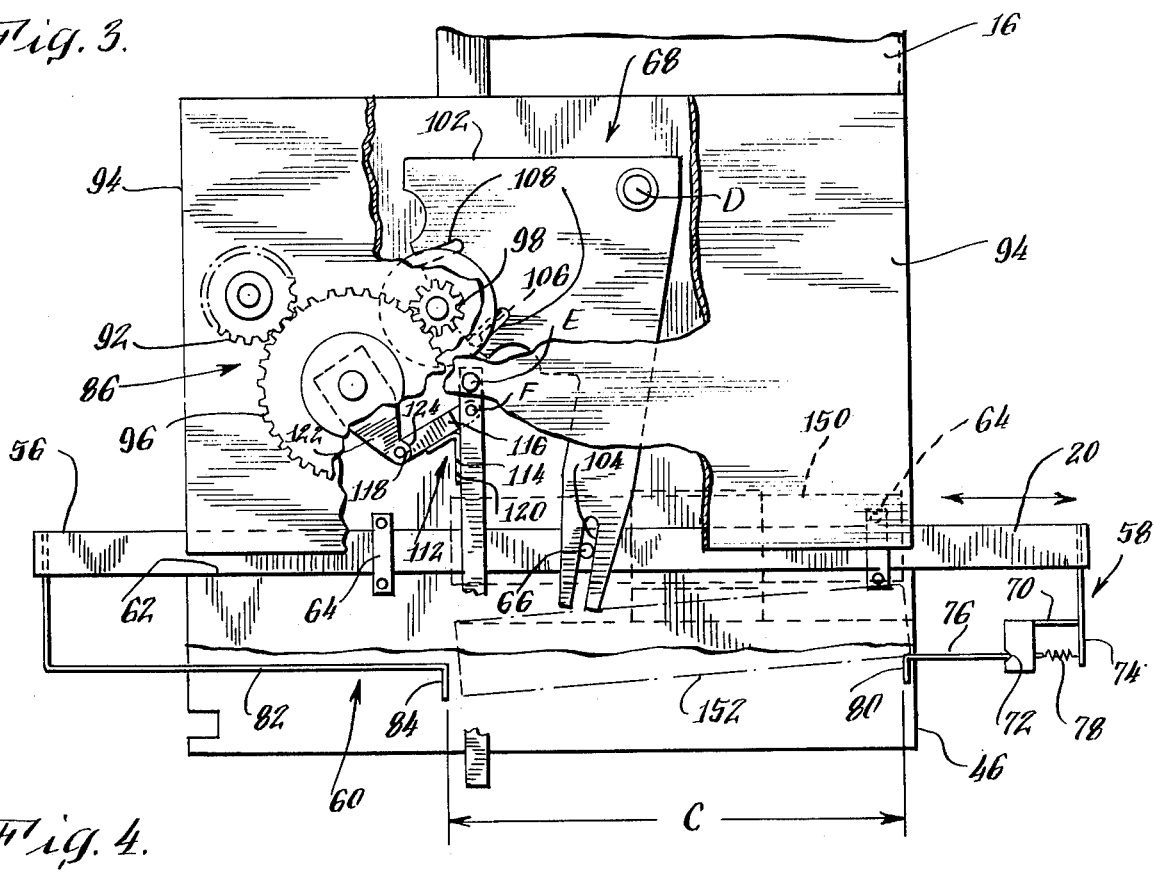
FIG. 3 is a side view in partial cross-section, of the changer of FIGS. 1 and 2.

Referring to FIG. 3, a cassette that is supported by the jaws 22, 24 is shown in dashed form at 150 at a time immediately receeding time 5'. At time 5' the cassette is released by rotational movement of the jaws 22, 24 and falls toward the insertion/ extraction mechanism. It is important that at this point, the bar 56 be positioned so that the front insertion surface 80 will be struck by the falling cassette and that the falling cassette will miss the rear extraction surface 84 by a small margin so that the cassette will be canted or angled as shown at 152. This canting operation assists in proper insertion of the cassette into the player receiving mechanism and is furthered by the action of the spring-mounting method of the insertion piece 76.

At time 4', C-shaped bar 56 again begins its movement in a back direction as the pin 106 of the geneva drive mechanism 100 engages another slot 108 and at that point, front insertion surface 80 begins pushing the released cassette so that it will properly enter the player receiving portion. Between the time 4' and 3', the actuating arm 122, which attached to the same shaft as gear 96 and is rotating in a clockwise direction, will touch the top surface 154 of the small lever 116, will compress angulated spring 120 and will rotate past the position shown in FIG. 3. At time 3', the bar 56 will again be in a full back position and the cassette will be ready to be lowered into the player so that a program may begin playing. At that point, switch 148 shown in FIG. 6 will change positions and to set the play flip-flop 134 and reverse the motor field in preparation for the following cycle. At time 2' the cassette player will lower the cassette into a play position and the lever 110 will move to the back position. When the lever 110 has reached the back position at time 1', shown generally in FIG. 2, the tape cassette is played until one of the reject signals starts the cyle again.

Although the invention has been described with reference to specific embodiments thereof, many other variations and modifications of the invention will be apparent to those skilled in the art without departing from the spirit and scope of the invention. The above described embodiments are, therefore, intended to be merely exemplary, and all such variations and modifications are intended to be included within the scope of the invention as defined in the appended claims.

I claim:

1. A video tape cassette changer for use with a video cassette tape player that has a cassette receiving means including a cassette raising and lowering mechanism which receives a cassette at a predetermined angle from horizontal for lowering a received cassette into a play position and raising a rejeced cassette out of the play position comprising:
    a chute positioned in proximity to the player receiving means and shaped to receive a plurality of stacked video tape cassettes for playing;
    means for supporting the stack of cassettes and for releasing the lowest cassette in the stack;
    cassette insertion/extraction means positioned in proximity to the player receiving means and the support means for inserting a released cassette in the receiving means and for extracting a raised cassette from the receiving means and including (1) a rear extraction surface for contacting a raised cassette, (2) an insertion plate that has a front insertion surface for contacting a released cassette and (3) means for resiliantly attaching said plate to said insertion/extraction means, and
    means for synchronizing the support means and the insertion/extraction means with the player receiving means to control the changer so that (1) a cassette for playing is inserted in the receiving means after ejection of a rejected cassette from the changer and (2) said insertion/extraction means is positioned so that an edge of a cassette released by the support means strikes the front insertion surface whereby the cassette is oriented at said predetermined angle for insertion of the cassette into the cassette raising and lowering mechanism.

2. A video tape cassette changer according to claim 1 and further including means for initiating the rejection of a cassette at any time during the play cycle.

3. A video tape cassette changer according to claim 2 and further including means for selecting a rewind-only mode of operation for the cassette player and further wherein said rejection initiating means permits rejection of a cassette at any time during the play or rewind cycle.

4. A video tape cassette changer according to claim 1 wherein said supporting means has a first position for supporting the stack of cassettes and a second position for gripping and releasing the lowest cassette in the stack while supporting the remaining cassettes in the stack.

5. A video tape cassette changer according to claim 4 wherein said supporting means has (1) an upper support surface for support of the remaining cassettes in the stack and (2) a separating edge for parting the lowest cassette from the stack upon gripping and releasing of the lowest cassette.

6. A video tape cassette changer according to claim 1 wherein said support means include resiliant suspension means for suspending the support means and the cassettes in the stack.

7. A video tape cassette changer according to claim 6 wherein the cassettes remaining after release of the lowest cassette drop into the supporting means and said supporting means has a lower supporting surface for retaining and remaining cassettes, and further wherein said suspension means is arranged for resilient vertical movement to minimize the shock of the drop to the remaining cassettes.

8. A video tape cassette changer according to claim 1 wherein:
    said cassette insertion/extraction means further includes
    a bar and means for slideably mounting said bar in the changer for front and rear movement, and
    said means for synchronizing further includes a gear train and a geneva mechanism that is driven by said gear train and that is arrangedto actuate said bar for front and rear movement thereof so that a cassette for playing is inserted in the receiving means after ejection of a rejected cassette from the changer.

9. A video tape cassette changer according to claim 8 wherein said bar is generally C-shaped and has a rear extraction surface and wherein said insertion/extraction means further includes an insertion plate that has a front insertion surface for insertion of a released cassette and means for resiliantly attaching said plate to said bar and further wherein said synchronizing means controls the changer so that said insertion/ extraction means is positioned to insure that a cassette which is released by the gripping means strikes the front insertion surface to assist in the insertion of the cassette into the player receiving portion.

* * * * *